United States Patent
Yamasaki et al.

(10) Patent No.: US 9,353,837 B2
(45) Date of Patent: May 31, 2016

(54) ELECTRIC LINEAR MOTION ACTUATOR

(71) Applicants: Tatsuya Yamasaki, Shizuoka (JP); Yui Masuda, Shizuoka (JP); Makoto Muramatsu, Shizuoka (JP); Masaaki Eguchi, Shizuoka (JP); Yuki Saoyama, Shizuoka (JP)

(72) Inventors: Tatsuya Yamasaki, Shizuoka (JP); Yui Masuda, Shizuoka (JP); Makoto Muramatsu, Shizuoka (JP); Masaaki Eguchi, Shizuoka (JP); Yuki Saoyama, Shizuoka (JP)

(73) Assignee: NTN CORPORATION, Osaka (JP)

(*) Notice: Subject to any disclaimer, the term of this patent is extended or adjusted under 35 U.S.C. 154(b) by 86 days.

(21) Appl. No.: 14/354,935

(22) PCT Filed: Oct. 31, 2012

(86) PCT No.: PCT/JP2012/078140
§ 371 (c)(1),
(2) Date: Apr. 29, 2014

(87) PCT Pub. No.: WO2013/065724
PCT Pub. Date: May 10, 2013

(65) Prior Publication Data
US 2014/0290402 A1    Oct. 2, 2014

(30) Foreign Application Priority Data
Nov. 2, 2011    (JP) .................. 2011-241064

(51) Int. Cl.
*F16H 48/30*    (2012.01)
*F16H 25/20*    (2006.01)
(Continued)

(52) U.S. Cl.
CPC .............. *F16H 25/20* (2013.01); *B60T 13/741* (2013.01); *F16D 55/226* (2013.01); *F16D 65/18* (2013.01);
(Continued)

(58) Field of Classification Search
CPC . F16H 25/20; F16H 25/2015; F16H 25/2252; F16D 55/226; F16D 65/18; F16D 66/00; F16D 65/14; F16D 2121/24; F16D 2125/40; F16D 2125/28; F16D 2125/50; B60T 13/741; H02K 11/0026; H02K 29/06; H02K 7/06
See application file for complete search history.

(56) References Cited

U.S. PATENT DOCUMENTS 6,098,479 A * 8/2000 Hoermansdoerfer . B60T 13/741
475/333
2003/0011334 A1    1/2003 Kifuku
(Continued)

FOREIGN PATENT DOCUMENTS

JP    07-064643    3/1995
JP    07-087770    3/1995
(Continued)

OTHER PUBLICATIONS

Japanese Office Action issued Jul. 21, 2015 in corresponding JP Application No. 2011-241064 (English translation).
(Continued)

*Primary Examiner* — David J Hlavka
(74) *Attorney, Agent, or Firm* — Wenderoth, Lind & Ponack, L.L.P.

(57) ABSTRACT

An electric linear motion actuator includes: a rotary shaft to be driven by an electric motor; a plurality of planetary rollers kept in rolling contact with a cylindrical surface formed on an outer periphery of the rotary shaft; a carrier which retains the planetary rollers such that the planetary rollers are rotatable about axes thereof while revolving around the rotary shaft, and of which axial movement is restricted; and an outer ring member surrounding the planetary rollers and supported so as to be slidable in an axial direction. Helical ribs are formed on an inner periphery of the outer ring member; and circumferential grooves are formed on an outer periphery of each of the planetary rollers so as to be engaged with the helical ribs. A rotation of the rotary shaft is thus converted to a linear motion of the outer ring member.

17 Claims, 5 Drawing Sheets (51) Int. Cl.
*F16D 65/18* (2006.01)
*H02K 7/06* (2006.01)
*H02K 29/06* (2006.01)
*B60T 13/74* (2006.01)
*F16H 25/22* (2006.01)
*F16D 55/226* (2006.01)
*F16D 121/24* (2012.01)
*F16D 125/40* (2012.01)
*F16D 125/48* (2012.01)
*F16D 125/50* (2012.01)
*F16D 66/00* (2006.01)

(52) U.S. Cl.
CPC ........ *F16H 25/2015* (2013.01); *F16H 25/2252* (2013.01); *H02K 7/06* (2013.01); *H02K 11/22* (2016.01); *H02K 29/06* (2013.01); *F16D 2066/003* (2013.01); *F16D 2121/24* (2013.01); *F16D 2125/40* (2013.01); *F16D 2125/48* (2013.01); *F16D 2125/50* (2013.01); *Y10T 74/18576* (2015.01)

(56) References Cited

U.S. PATENT DOCUMENTS

| | | | | |
|---|---|---|---|---|
| 2007/0144281 A1* | 6/2007 | Inoue | ................ | F16H 25/2015 74/89.23 |
| 2009/0095579 A1* | 4/2009 | Yamasaki | ............... | F16D 65/18 188/72.7 |
| 2011/0053723 A1* | 3/2011 | Erhart | ...................... | F16H 3/72 475/1 |
| 2011/0079099 A1* | 4/2011 | Himmelmann | ..... | F16H 25/2015 74/411.5 |
| 2012/0048659 A1* | 3/2012 | Thibaut | ................. | B60T 13/741 188/106 F |
| 2012/0181137 A1* | 7/2012 | Yamasaki | ............... | F16D 65/18 192/84.6 |
| 2012/0241281 A1 | 9/2012 | Franz et al. | | |
| 2013/0168192 A1* | 7/2013 | Yasui | ..................... | F16D 65/18 188/72.1 |
| 2013/0186717 A1* | 7/2013 | Muramatsu | ........... | F16D 55/226 188/72.1 |

FOREIGN PATENT DOCUMENTS

| | | |
|---|---|---|
| JP | 2001-304313 | 10/2001 |
| JP | 2002-171779 | 6/2002 |
| JP | 2003-033077 | 1/2003 |
| JP | 2008-039169 | 2/2008 |
| JP | 2008-291949 | 12/2008 |
| JP | 2010-065777 | 3/2010 |
| JP | 2011-169352 | 9/2011 |
| JP | 2011-174575 | 9/2011 |
| WO | 2011/050767 | 5/2011 |

OTHER PUBLICATIONS

International Search Report issued Jan. 15, 2013 in International (PCT) Application No. PCT/JP2012/078140.

* cited by examiner

ELECTRIC LINEAR MOTION ACTUATOR

TECHNICAL FIELD

This invention relates to an electric linear motion actuator in which the rotation of a rotary shaft driven by an electric motor is converted to the linear motion of a linear motion member and a targeted member is pressed by the linear motion member.

BACKGROUND ART

As brake systems for a vehicle, hydraulic brake systems have been used in which a friction pad is driven by a hydraulic cylinder to be pressed against a brake disk. However, in recent years, with the introduction of brake control such as anti-lock brake system (ABS), electric brake systems are gathering attention in which no hydraulic circuit is used.

In electric brake systems, an electric linear motion actuator is used to convert the rotation of a rotary shaft driven by an electric motor to the linear motion of a linear motion member, and a friction pad driven by this electric linear motion actuator is pressed against a brake disk, so as to generate braking force.

An electric linear motion actuator used in such electric brake systems is disclosed, for example, in the below-identified Patent document 1. The electric linear motion actuator disclosed in Patent document 1 includes a rotary shaft to be driven by an electric motor, a plurality of planetary rollers kept in rolling contact with the cylindrical surface formed on the outer periphery of the rotary shaft, a carrier which retains the plurality of planetary rollers such that the respective planetary rollers are rotatable about their axes while revolving around the rotary shaft and of which the axial movements are restricted, and an outer ring member surrounding the plurality of planetary rollers and supported so as to be slidable in the axial direction. Helical ribs are formed on the inner periphery of the outer ring member, and helical grooves are formed on the outer peripheries of the respective planetary rollers so as to be engaged with the helical ribs.

When the electric motor rotates the rotary shaft, the respective planetary rollers, which are kept in rolling contact with the rotary shaft, revolve around the rotary shaft while rotating about their axes. When the planetary rollers revolve around the rotary shaft, the outer ring member makes a linear motion due to a difference in lead angle between the helical ribs on the inner periphery of the outer ring member and the helical grooves on the outer peripheries of the respective planetary rollers, so that the friction pad is driven by the outer ring member, which makes a linear motion, so as to be pressed against the brake disk.

PRIOR ART DOCUMENT(S)

Patent Document(s)

Patent document 1: Japanese Unexamined Patent Application Publication No. 2010-65777.

Problems to be Solved by the Invention

In the above electric brake systems, if the clearances between the brake disk and the respective friction pads are too narrow when the brake is released, the brake disk tends to contact the respective friction pads, generating resistance therebetween, due e.g. to run-out of the brake disk. This might lead to reduced fuel efficiency or abnormal wear of the friction pads. If the clearances between the brake disk and the respective friction pads are too wide, when the brake is applied, it takes longer time for the respective friction pads to move to and contact the brake disk. As a result thereof, responsiveness of the brake is deteriorated.

Therefore, the clearances between the brake disk and the respective friction pads need to be adjusted to have a predetermined size. In order to perform the adjustment of the clearances, the axial position of the outer ring member needs to be controlled.

In order to control the position of the outer ring member, the inventors of the present invention considered a method to detect the rotation angle of the electric motor by a rotation sensor from the position where the respective friction pads are pressed against the brake disk and control the axial position of the outer ring member based on the rotation angle of the electric motor detected by the rotation sensor.

However, when the position of the outer ring member was actually controlled based on the rotation angle of the electric motor, one problem occurred. Specifically, though it was possible to accurately control the position of the outer ring member right after the start of the control, after that, accuracy of the position of the outer ring member deteriorated.

The inventors of the present invention investigated the cause of this problem and discovered the following points. Specifically, in an electric linear motion actuator in which planetary rollers are used, since torque is transmitted from the rotary shaft to the respective planetary rollers using friction between the rotary shaft and the respective planetary rollers, slight slippage occurs between the rotary shaft and the respective planetary rollers at times. Especially when the axial load is applied to the outer ring member (namely, when the friction pads are pressed against the brake disk), slippage tends to occur between the rotary shaft and the respective planetary rollers. As a result thereof, the axial position of the outer race calculated based on the rotation angle of the electric motor is different from the actual axial position of the outer ring member due to the slippage between the rotary shaft and the respective planetary rollers.

SUMMARY OF THE INVENTION

It is an object of the present invention to provide an electric linear motion actuator capable of accurately controlling the axial position of the outer ring member.

Means for Solving the Problems

In order to achieve the above object, the inventors of the present invention focused on the points that if slippage occurs between the rotary shaft and the respective planetary rollers, though the axial position of the outer ring member calculated based on the rotation angle of the rotary shaft is different from the actual axial position of the outer ring member corresponding to the slippage between the rotary shaft and the respective planetary rollers, the axial position calculated based on the rotation angle of the carrier is equal to the actual axial position of the outer ring member. Based on this discovery, according to the present invention, in an electric linear motion actuator comprising: a rotary shaft to be driven by an electric motor; a plurality of planetary rollers kept in rolling contact with the cylindrical surface formed on the outer periphery of the rotary shaft; a carrier which retains the plurality of planetary rollers such that the planetary rollers are rotatable about axes of the respective planetary rollers while revolving around the rotary shaft and of which the axial movement is restricted; and an outer ring member surrounding the plurality of planetary rollers and supported so as to be slidable in the axial direction, wherein a helical rib is formed on the inner periphery of the outer ring member; and a helical groove or a circumferential groove is formed on the outer periphery of each of the planetary rollers so as to be engaged with the helical rib, whereby the rotation of the rotary shaft is converted to the linear motion of the outer ring member, a revolution sensor is provided which detects the rotation angle of the carrier or the rotation angle of a member which revolves together with the carrier.

In such an electric linear motion actuator, even if slippage occurs between the rotary shaft and the respective planetary rollers, the axial position of the outer ring member calculated based on the rotation angle of the carrier is equal to the actual axial position of the outer ring member. Therefore, it is possible to accurately control the axial position of the outer ring member by controlling the position of the outer ring member based on the rotation angle of the carrier detected by the revolution sensor.

It is preferable that this electric linear motion actuator further comprises a rotation angle detecting means for detecting the rotation angle of the electric motor.

The electric linear motion actuator, in which the rotation angle detecting means for detecting the rotation angle of the electric motor is provided, can further comprise an abnormality detecting means which compares the rotation angle of the electric motor detected by the rotation angle detecting means and the rotation angle of the carrier detected by the revolution sensor, and judges that an abnormality is occurring if the ration between the rotation angle of the electric motor and the rotation angle of the carrier exceeds a predetermined abnormality threshold value, thereby making it possible to detect abnormality occurrence such as abnormal slippage between the rotary shaft and the respective planetary rollers.

Also, in the electric linear motion actuator, in which the rotation angle detecting means for detecting the rotation angle of the electric motor is provided, while the actuator is operating normally, the position of the outer ring member is controlled based on the rotation angle of the carrier detected by the revolution sensor, and if the revolution sensor becomes out of order, the position of the outer ring member can be controlled based on the rotation angle of the electric motor detected by the rotation angle detecting means, thereby enabling the actuator to have higher redundancy.

The electric linear motion actuator can further comprise an abnormality informing means configured to inform outside, if any abnormality is detected by the abnormality detecting means, about the abnormality. The abnormality informing means may be, for example, a warning buzzer, a warning indicator light, or an electronic control device which displays warning on a screen monitor.

In the electric linear motion actuator, in which a reaction force receiving member supporting the carrier through a thrust bearing is provided, the revolution sensor can comprise an annular target arranged coaxially with the carrier so as to rotate together with the carrier, and a target position detector fixed in position so as to be opposed to the target.

The target position detector is kept out of contact with the target, and thus can comprise a light emitting portion which emits light toward the target, and a light receiving portion which receives light penetrating or reflected by the target. Such a revolution sensor is durable and thus can be used for a long period of time, because the target position detector and the target are not in contact with each other.

It is preferable that the target is magnetized such that first magnetic poles are arranged alternately with second magnetic poles opposite in polarity to the first magnetic poles in the circumferential direction, and the target position detector is a magnetism detector kept out of contact with the target. Such a revolution sensor is not only durable and thus can be used for a long period of time, but can also keep stable detection accuracy even if dirt adheres to the revolution sensor, because the target position detector and the target are not in contact with each other.

The rotation angle detecting means may be, for example, a power supply unit which estimates a rotation angle based on a line voltage between lines through which electric power is supplied to the electric motor.

Effects of the Invention

The electric linear motion actuator according to the present invention is capable of accurately controlling the axial position of the outer ring member by controlling the position of the outer ring member based on the rotation angle of the carrier detected by the revolution sensor, even if slippage occurs between the rotary shaft and the respective planetary rollers.

BEST MODE FOR CARRYING OUT THE INVENTION

Figure 1:
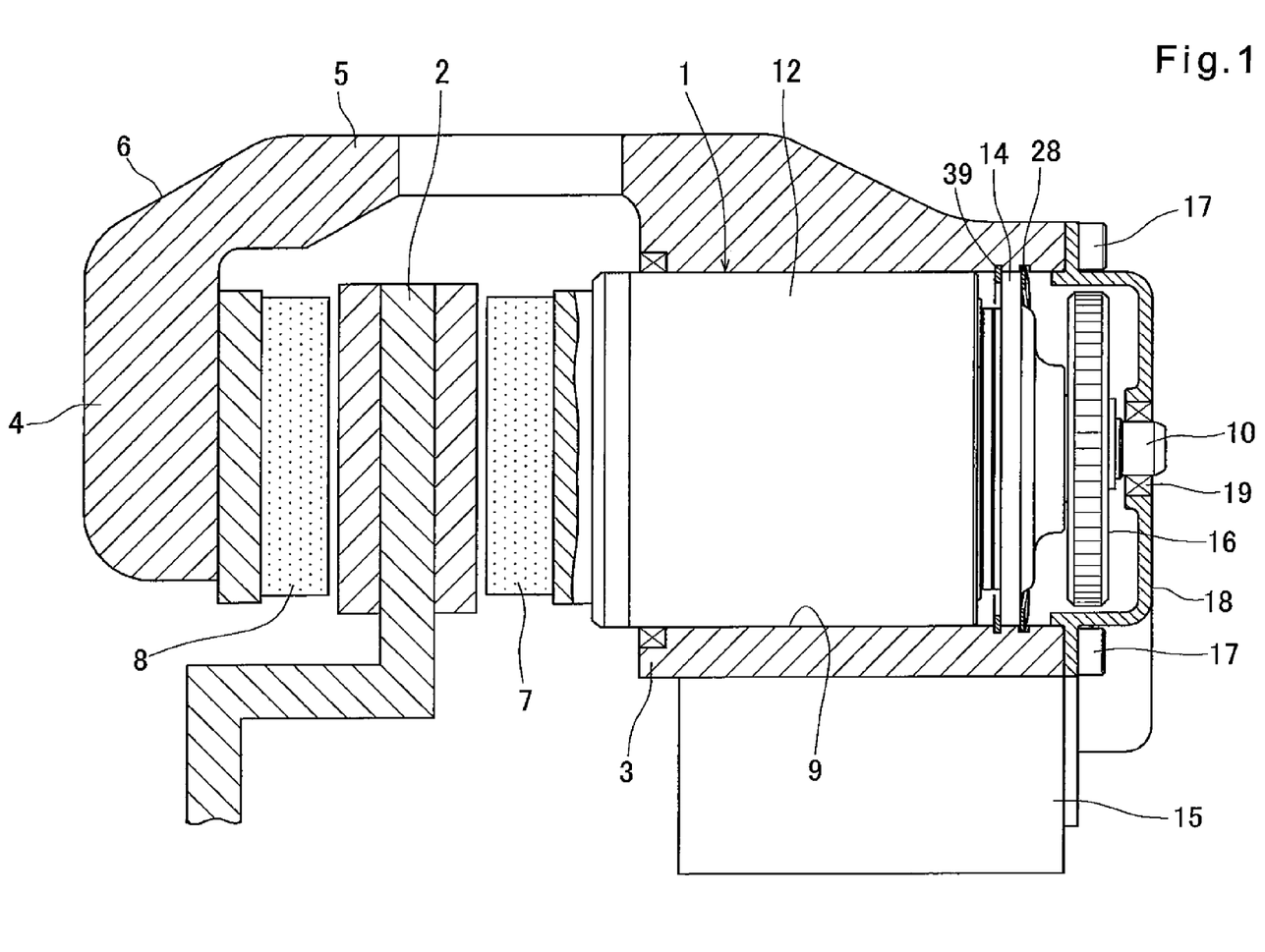
FIG. 1 is a sectional view of an electric brake system in which an electric linear motion actuator according to an embodiment of the present invention is incorporated.

FIG. 1 illustrates an electric brake system for a vehicle in which an electric linear motion actuator 1 according to the embodiment of the present invention is used. This electric brake system includes a caliper body 6 having opposed pieces 3 and 4 coupled through a bridge 5 so as to be opposed to each other through a brake disk 2 which rotates together with a wheel, and a left and right pair of friction pads 7 and 8. The electric linear motion actuator 1 is incorporated in a receiving hole 9 formed such that the surface of the piece 3 opposed to the brake disk 2 is open.

The friction pads 7 and 8 are provided between the opposed piece 3 and the brake disk 2 and between the opposed piece 4 and the brake disk 2, respectively, and supported so as to be movable in the axial direction of the brake disk 2 relative to a mount (not illustrated) fixed to a knuckle (not illustrated) supporting the wheel. The caliper body 6 is also supported by the mount so as to be slidable in the axial direction of the brake disk 2.

Figure 2:
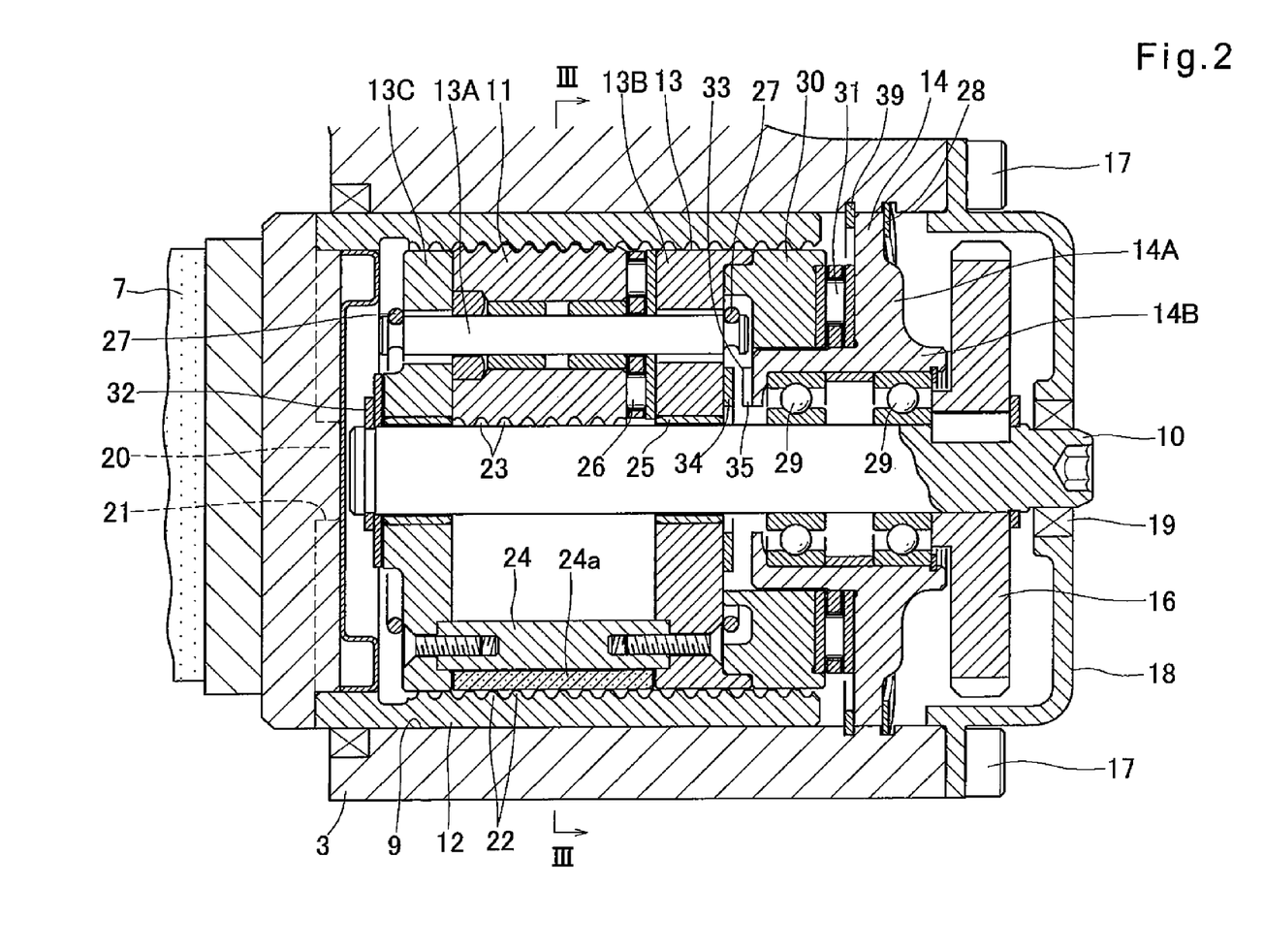
FIG. 2 is an enlarged sectional view of the electric linear motion actuator illustrated in FIG. 1.

As illustrated in FIG. 2, the electric linear motion actuator 1 includes a rotary shaft 10, a plurality of planetary rollers 11 kept in rolling contact with the cylindrical surface formed on the outer periphery of the rotary shaft 10, an outer ring member 12 arranged to surround the planetary rollers 11, a carrier 13 retaining the planetary rollers 11 such that the respective planetary rollers 11 are rotatable about their axes while orbiting, and a reaction force receiving member 14 arranged axially rearward of the outer ring member 12.

The rotation of an electric motor 15 illustrated in FIG. 1 is transmitted to the rotary shaft 10 through a gear 16, so that the rotary shaft 10 is rotated by the electric motor 15. The rotary shaft 10 is inserted in the receiving hole 9, which extends axially through the opposed piece 3, such that one end of the rotary shaft 10 protrudes axially from the axially rear opening of the receiving hole 9. The gear 16 is fixed to the portion of the rotary shaft 10 protruding axially from the receiving hole 9. The gear 16 is covered by a lid 18 fixed with bolts 17 such that the lid 18 closes the axially rear opening of the receiving hole 9. A bearing 19 is incorporated in the lid 18 so as to rotatably support the rotary shaft 10.

Figure 3:
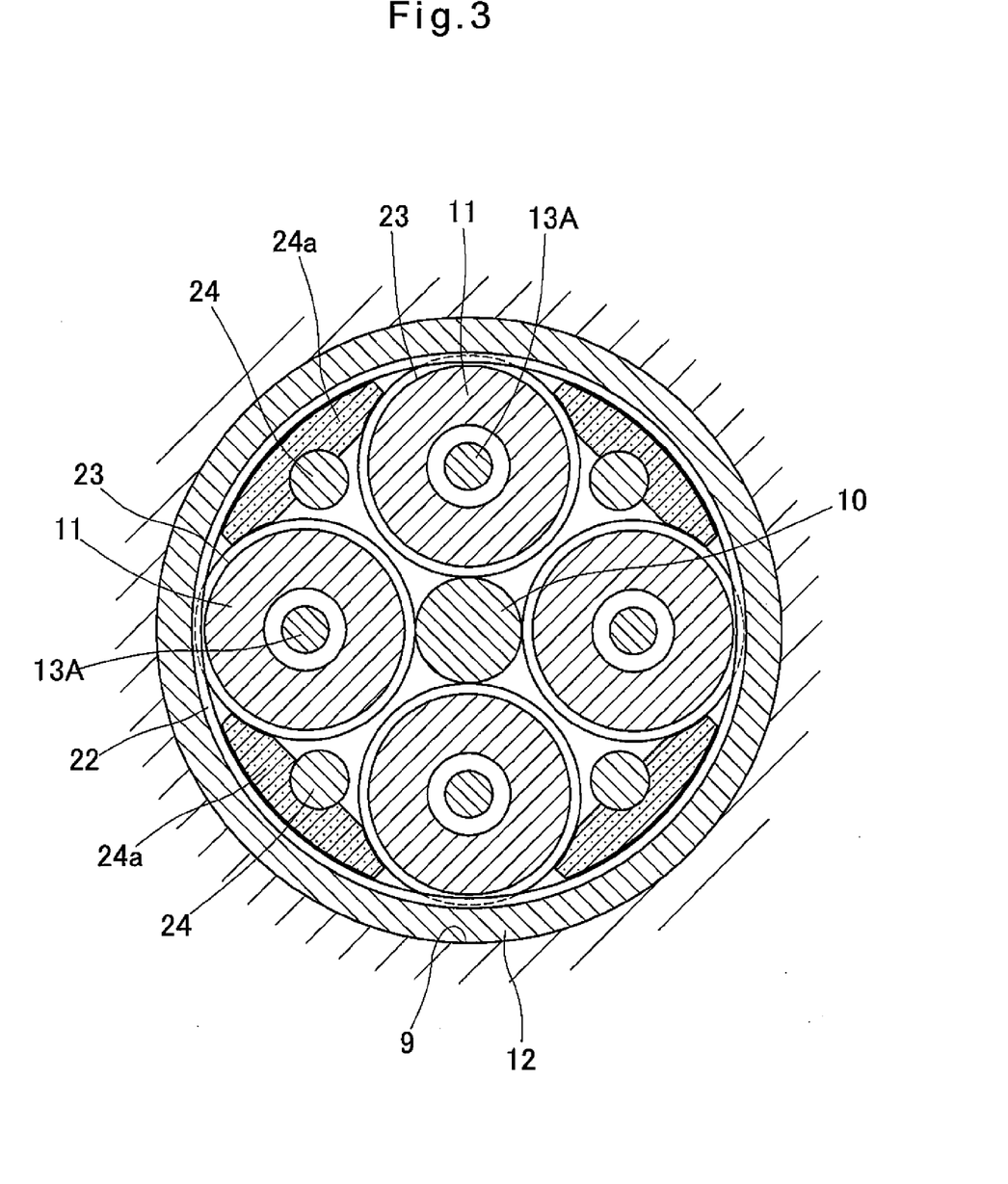
FIG. 3 is a sectional view taken along the line III-III of FIG. 2.

As illustrated in FIG. 3, the planetary rollers 11 are kept in rolling contact with the cylindrical surface of the outer periphery of the rotary shaft 10, so that when the rotary shaft 10 rotates, the planetary rollers 11 also rotate due to friction between the rotary shaft 10 and the respective planetary rollers 11. The planetary rollers 11 are provided inside the outer ring member 12 so as to be circumferentially spaced apart from each other.

As illustrated in FIG. 2, the outer ring member 12 is received in the receiving hole 9 formed in the opposed piece 3 of the caliper body 6, and is axially slidably supported by the inner periphery of the receiving hole 9. The outer ring member 12 is formed at its axial front end with an engagement recess 21 in which is engaged an engagement rib 20 formed on the back surface of the friction pad 7, and is rotationally fixed to the caliper body 6 due to engagement of the engagement rib 20 in the engagement recess 21.

The outer ring member 12 is formed on its inner periphery with helical ribs 22, and the respective planetary rollers 11 are formed on their outer peripheries with circumferential grooves 23 in which the helical ribs 22 are engaged. When the planetary rollers 11 rotate, the helical ribs 22 of the outer ring member 12 are guided by the circumferential grooves 23 of the respective planetary rollers 11 so that the outer ring member 12 moves in the axial direction. In this embodiment, though the circumferential grooves 23, which have a 0 degree lead angle, are formed on the outer peripheries of the respective planetary rollers 11, the circumferential grooves 23 may be replaced by helical grooves having a lead angle different from that of the helical ribs 22.

The carrier 13 includes carrier pins 13A rotatably supporting the respective planetary rollers 11, an annular carrier plate 13C retaining the axial front ends of the respective carrier pins 13A such that the axial front ends thereof are circumferentially spaced apart from each other, and an annular carrier body 13B retaining the axially rear ends of the respective carrier pins 13A such that the axially rear ends thereof are circumferentially spaced apart from each other. The carrier plate 13C and the carrier body 13B are axially opposed to each other through the planetary rollers 11, and are coupled together through coupling rods 24 arranged between the respective circumferentially adjacent planetary rollers 11. Lubricant applying members 24a are attached to the respective coupling rods 24 so as to apply a lubricant to the outer peripheries of the respective planetary rollers 11.

The carrier body 13B is supported through a slide bearing 25 by the rotary shaft 10 such that the carrier body 13B is rotatable relative to the rotary shaft 10. Thrust bearings 26 are incorporated between the carrier body 13B and the respective planetary rollers 11 so as to stop the rotations of the respective planetary rollers 11 from being transmitted to the carrier body 13B.

The carrier pins 13A are radially inwardly biased by radially compressing ring springs 27 wrapped around the circumferentially spaced apart carrier pins 13A. Biasing force of the radially compressing ring springs 27 presses the outer peripheries of the respective planetary rollers 11 against the outer periphery of the rotary shaft 10, thereby preventing slippage between the rotary shaft 10 and the respective planetary rollers 11. The radially compressing ring springs 27 are mounted on both ends of the respective carrier pins 13A so that biasing force of the radially compressing ring springs 27 acts on the respective planetary rollers 11 over the entire axial length thereof.

The reaction force receiving member 14 includes an annular disk portion 14A, and a tubular portion 14B integrally provided at the radially inner portion of the annular disk portion 14A. The annular disk portion 14A is fitted in the inner periphery of the receiving hole 9 at a portion of the receiving hole 9 located axially rearward of the portion of the receiving hole 9 where the outer ring member 12 slides. The radially outer portion of the annular disk portion 14A is locked in position by means of a snap ring 28 attached to the inner periphery of the receiving hole 9. A plurality of axially spaced apart rolling bearings 29 are incorporated in the inner periphery of the tubular portion 14B so as to rotatably support the rotary shaft 10. The linear motion actuator further includes, between the carrier 13 and the annular disk portion 14A, a spacer 30 rotatable about the rotary shaft 10 together with the carrier 13, and a thrust bearing 31 rotatably supporting the spacer 30.

The snap ring 28 and a snap ring 39 attached to the inner periphery of the receiving hole 9 restrict the axially forward and rearward movements of the reaction force receiving member 14. The reaction force receiving member 14 axially supports the carrier body 13B through the spacer 30 and the thrust bearing 31, thereby restricting the axially rearward movement of the carrier 13. Also, a snap ring 32 attached to the axially front end of the rotary shaft 10 restricts the axially forward movement of the carrier 13. Namely, both of the axial forward and rearward movements of the carrier 13 are restricted, and since the respective planetary rollers 11 are supported by the carrier 13, the axial forward and rearward movements of the respective planetary rollers 11 are also kept restricted. But since the force generated when a brake is released and causing the reaction force receiving member 14 to move axially forward is very weak, the snap ring 39 may be omitted, provided the reaction force receiving member 14 is press-fitted (fitted with an interference fit) to the receiving hole 9 of the caliper body 6.

The tubular portion 14B of the reaction force receiving member 14 is inserted through the annularly-shaped spacer 30 such that the tubular portion 14B and the spacer 30 are rotatable relative to each other, and the portion of the tubular portion 14B inserted through the spacer 30 is axially opposed to the carrier body 13B. A revolution sensor 33 is provided between the opposed surfaces of the tubular portion 14B and the carrier body 13B so as to detect the rotation angle of the carrier 13. The revolution sensor 33 includes an annular target 34 coaxially fixed to the carrier body 13B so as to rotate together with the carrier body 13B, and a target position detector 35 fixed to the tubular portion 14B of the reaction force receiving member 14 so as to be axially opposed to the target 34. The target position detector 35 is arranged not to be in contact with the target 34.

Though the revolution sensor 33 may be, for example, an electric contact encoder, it is preferable that the revolution sensor 33 is a photoelectric encoder including a target position detector 35 having a light emitting portion which emits light toward the target 34 and a light receiving portion which receives light reflected by the target 34. Such a revolution sensor 33 is durable and thus can be used for a long period of time, because its target position detector 35 and target 34 are not in contact with each other.

The revolution sensor 33 may also be a magnetic encoder including a target 34 magnetized such that the opposite magnetic poles alternate with each other in the circumferential direction, and a target position detector 35 configured to detect a magnetic field generated by the target 34. Since the target position detector 35 and the target 34 are not in contact with each other, this revolution sensor 33 is not only durable and thus can be used for a long period of time, but can also keep stable detection accuracy even if dirt adheres to the revolution sensor 33. A revolution sensor 33 in the form of a capacitance encoder has also the above two advantages.

A rotation angle detecting means 36 (see FIG. 4) is incorporated in the electric motor 15 so as to detect the rotation angle of the electric motor 15. The rotation angle detecting means 36 may be a resolver or a hall element. Also, the rotation angle detecting means 36 may be a power supply unit which estimates the rotation angle of the electric motor 15 based on the line voltage between lines through which electric power is supplied to the electric motor 15.

Figure 4:
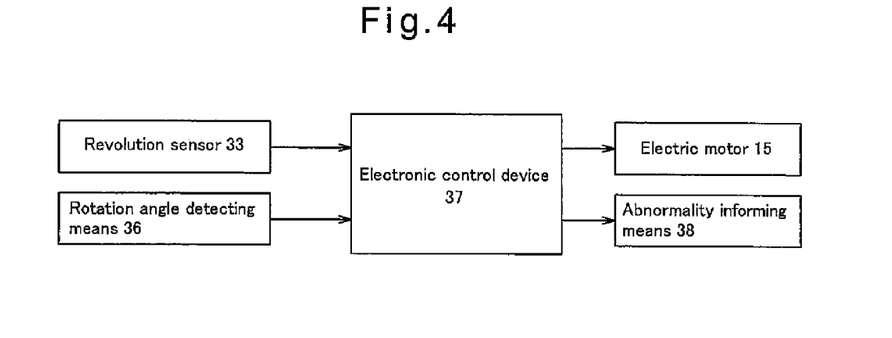
FIG. 4 is a block diagram of an electronic control device which controls an electric motor illustrated in FIG. 1.

The electric motor 15 is controlled by an electronic control device 37 illustrated in FIG. 4. A signal corresponding to the rotation angle of the carrier 13 is input to the electronic control device 37 from the revolution sensor 33. A signal corresponding to the rotation angle of the electric motor 15 is input to the electronic control device 37 from the rotation angle detecting means 36. A control signal is output from the electronic control device 37 so as to control the rotation angle of the electric motor 15. Also, an abnormality informing means 38 is connected to the electronic control device 37 so as to inform a driver of abnormalities. The abnormality informing means 38 may be, for example, a warning buzzer, a warning indicator light, or an electronic control device which displays warning on a screen monitor.

It is now described how the electric linear motion actuator 1 described above operates.

When the electric motor 15 is activated, the rotary shaft 10 rotates, so that the planetary rollers 11 revolve around the rotary shaft 10 while rotating about the respective carrier pins 13A. This causes the outer ring member 12 and the planetary rollers 11 to be moved axially relative to each other due to engagement of the helical ribs 22 in the circumferential grooves 23 of the respective planetary rollers 11. However, since the axial movements of the respective planetary rollers 11 as well as the carrier 13 are restricted, the planetary rollers 11 do not move in the axial direction, so that only the outer ring member 12 moves in the axial direction. In this way, the rotation of the rotary shaft 10, driven by the electric motor 15, is converted to the linear motion of the outer ring member 12, and the friction pad 7 is driven by the outer ring member 12 and pressed against the brake disk 2, so that braking force of the electric brake system is generated by the electric linear motion actuator 1.

When the friction pad 7 is pressed against the brake disk 2, the reaction force to the load pressing the brake disk 2 is applied to the outer ring member 12. The reaction force is received by the reaction force receiving member 14 through the planetary rollers 11, the carrier 13, the spacer 30, and the thrust bearing 31.

In the electric brake system described above, if the clearances between the friction pad 7 and the brake disk 2 and between the friction pad 8 and the brake disk 2 are too narrow when the brake is released, the brake disk 2 tends to contact the friction pads 7 and 8, generating resistance therebetween, due e.g. to run-out of the brake disk 2. This might lead to reduced fuel efficiency of the vehicle or abnormal wear of the friction pads 7 and 8. If the clearances between the friction pad 7 and the brake disk 2 and between the friction pad 8 and the brake disk 2 are too wide, when the brake is applied, it takes longer time for the friction pads 7 and 8 to move to and contact the brake disk 2. As a result thereof, responsiveness of the brake is deteriorated.

The electronic control device 37 controls the axial position of the outer ring member 12 so that the clearances between the friction pad 7 and the brake disk 2 and between the friction pad 8 and the brake disk 2 have a predetermined size. One of the ways to control the position of the outer ring member 12 is to detect the rotation angle of the electric motor 15 by the rotation angle detecting means 36 from the position where the friction pads 7 and 8 are pressed against the brake disk 2 and control the axial position of the outer ring member 12 based on the rotation angle of the electric motor 15 detected by the rotation angle detecting means 36.

However, in the above electric linear motion actuator 1, in which the planetary rollers 11 are used, since torque is transmitted from the rotary shaft 10 to the respective planetary rollers 11 using friction between the rotary shaft 10 and the respective planetary rollers 11, slight slippage may occur between the rotary shaft 10 and the respective planetary rollers 11. Especially when the axial load is applied to the outer ring member 12 (namely, when the friction pads 7 and 8 are pressed against the brake disk 2), slippage tends to occur between the rotary shaft 10 and the respective planetary rollers 11.

Therefore, if the position of the outer ring member 12 is controlled based on the rotation angle of the electric motor 15 as described above, the axial position of the outer ring member 12 calculated based on the rotation angle of the electric motor 15 might be different from the actual axial position of the outer ring member 12 due to slippage between the rotary shaft 10 and the respective planetary rollers 11.

In order to overcome such a problem as described above, in the electric linear motion actuator 1 according to this embodiment, the position of the outer ring member 12 is controlled based on the rotation angle of the carrier 13 detected by the revolution sensor 33. Also, the electronic control device 37 compares the output from the revolution sensor 33 and the output from the rotation angle detecting means 36, so as to detect any abnormality occurrence such as abnormal slippage between the rotary shaft 10 and the respective planetary rollers 11 and inform a driver of such abnormality occurrence through the abnormality informing means 38.

Figure 5:
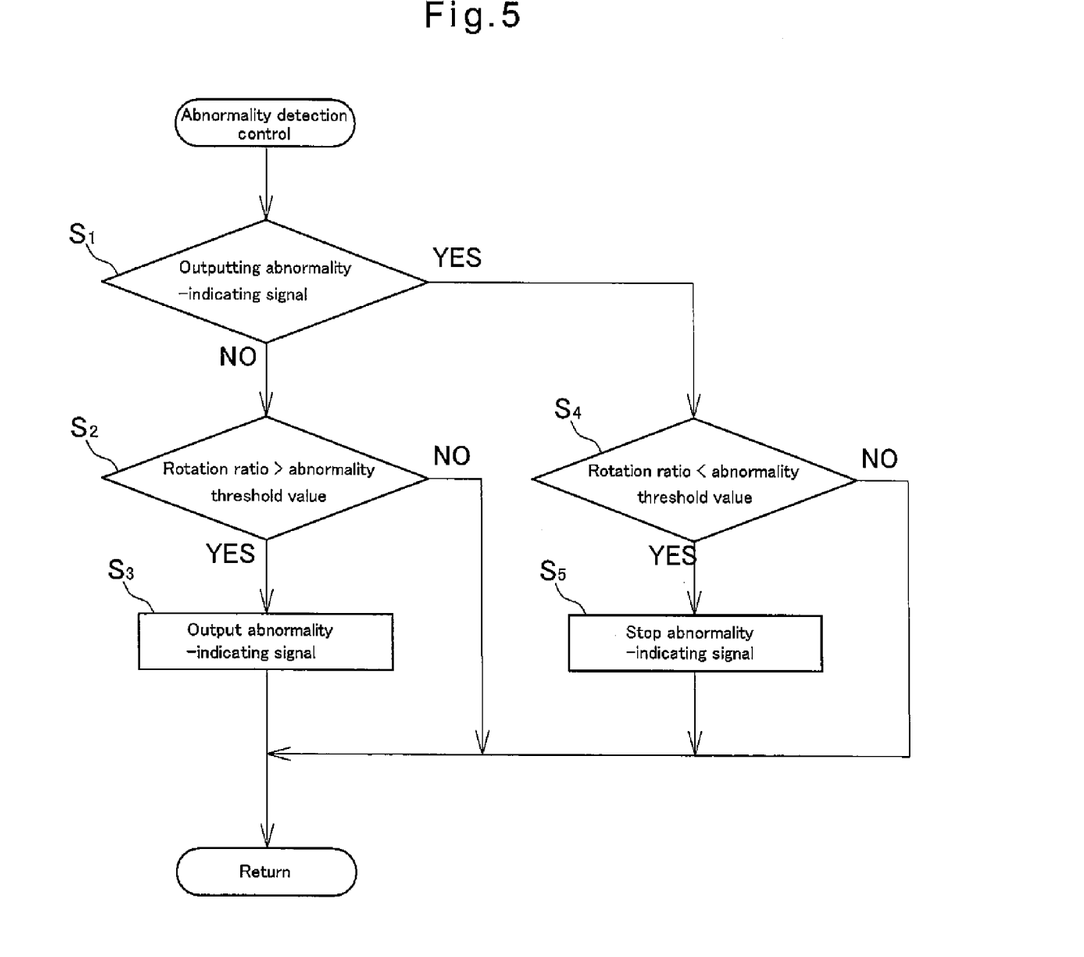
FIG. 5 is a flow chart illustrating an abnormality detection control of the electronic control device illustrated in FIG. 4.

This abnormality detection control is now described with reference to the flow chart illustrated in FIG. 5.

First, the electronic control device 37 compares the rotation angle of the electric motor 15 detected by the rotation angle detecting means 36 and the rotation angle of the carrier 13 detected by the revolution sensor 33, and judges whether or not the ratio of the rotation angle of the electric motor 15 to the rotation angle of the carrier 13 is higher than a predetermined abnormality threshold value (steps $S_1$ and $S_2$).

If this ratio is higher than the abnormality threshold value, since it is estimated that some abnormality is occurring in the electric linear motion actuator 1, the electronic control device 37 outputs an abnormality-indicating signal to the abnormality informing means 38 so that the abnormality informing means 38 informs a driver of the abnormality (step $S_3$). Many of such abnormalities are abnormal slippage between the rotary shaft 10 and the respective planetary rollers 11, and some are e.g. breakdown of the gear 16. Since abnormal slippage between the rotary shaft 10 and the respective planetary rollers 11 deteriorates responsiveness of the electric brake system, maintenance needs to be performed to the rotary shaft 10 and the planetary rollers 11 as soon as such abnormal slippage occurs.

When thereafter the ratio of the rotation angle of the electric motor 15 to the rotation angle of the carrier 13 falls below a predetermined release threshold value (<abnormality threshold value), since it is estimated that abnormal slippage between the rotary shaft 10 and the respective planetary rollers 11 has disappeared, the electronic control device 37 stops the abnormality-indicating signal (steps $S_4$ and $S_5$).

Since this electric linear motion actuator 1 is configured such that the position of the outer ring member 12 is controlled based on the rotation angle of the carrier 13 detected by the revolution sensor 33, even if slippage occurs between the rotary shaft 10 and the respective planetary rollers 11, it is possible to accurately control the axial position of the outer ring member 12.

Furthermore, this electric linear motion actuator 1 is configured such that when the actuator is operating normally, the position of the outer ring member 12 is controlled based on the rotation angle of the carrier 13 detected by the revolution sensor 33, and such that if the revolution sensor 33 fails, the position of the outer ring member 12 can be controlled based on the rotation angle of the electric motor 15 detected by the rotation angle detecting means 36. Therefore, this electric linear motion actuator 1 has higher redundancy than an electric linear motion actuator configured such that the position of the outer ring member 12 is controlled only based on the rotation angle of the electric motor 15.

Figure 6:
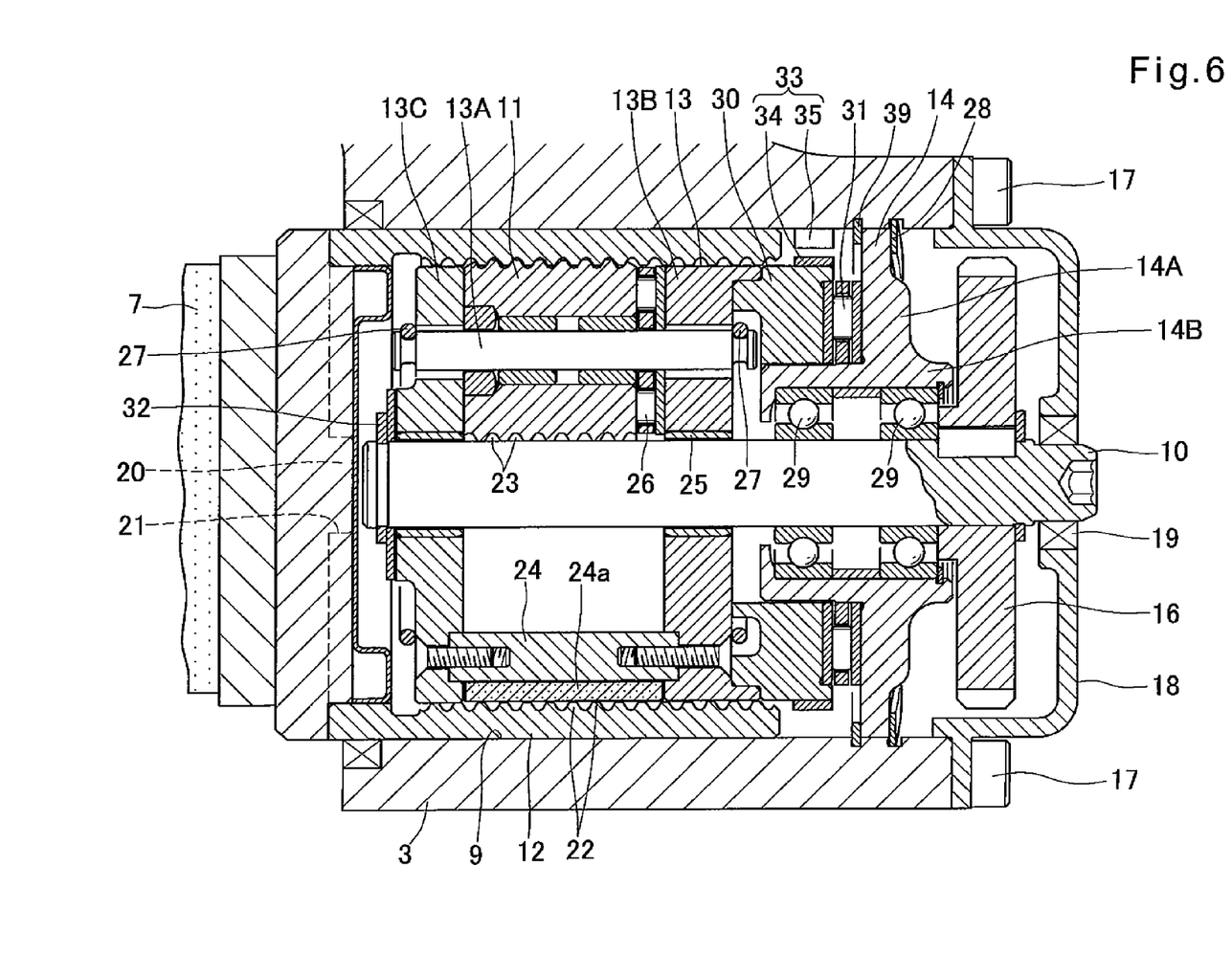
FIG. 6 is an enlarged sectional view of an electric linear motion actuator illustrating another example of a revolution sensor of FIG. 2.

In the above embodiment, the target 34 and the target position detector 35 of the revolution sensor 33 are arranged so as to be axially opposed to each other, as illustrated in FIG. 6. But instead, the target 34 and the target position detector 35 of the revolution sensor may be arranged so as to be radially opposed to each other.

In FIG. 6, the annular target 34 is fixed onto the outer periphery of the spacer 30, which rotates together with the carrier body 13B, and the target position detector 35 is fixed onto the inner periphery of the receiving hole 9 so as to be radially opposed to the target 34. This revolution sensor 33, like the revolution sensor 33 in the above embodiment, may also be a photoelectric encoder or a magnetic encoder.

DESCRIPTION OF REFERENCE NUMERALS

1: electric linear motion actuator
7, 8: friction pad
10: rotary shaft
11: planetary roller
12: outer ring member
13: carrier
14: reaction force receiving member
15: electric motor
22: helical rib
23: circumferential groove
30: spacer
31: thrust bearing
33: revolution sensor
34: target
35: target position detector
36: rotation angle detecting means
37: electronic control device
38: abnormality informing means
39: snap ring

The invention claimed is:

1. An electric linear motion actuator comprising:
a rotary shaft to be driven by an electric motor;
a plurality of planetary rollers kept in rolling contact with a cylindrical surface formed on an outer periphery of the rotary shaft;
a carrier which retains the plurality of planetary rollers such that each of the plurality of planetary rollers is rotatable about a longitudinal axis down a center thereof while revolving around the rotary shaft, and of which an axial movement is restricted;
an outer ring member surrounding the plurality of planetary rollers and supported so as to be slidable in an axial direction,
wherein a helical rib is formed on an inner periphery of the outer ring member; and one of a helical groove and a circumferential groove is formed on an outer periphery of each of the plurality of planetary rollers so as to be engaged with the helical rib, and
whereby a rotation of the rotary shaft is converted to a linear motion of the outer ring member; and
a revolution sensor which detects one of a first rotation angle which constitutes a rotation angle of the carrier and a second rotation angle which constitutes a rotation angle of a member which revolves together with the carrier.

2. The electric linear motion actuator according to claim 1, further comprising a rotation angle detector for detecting a rotation angle of the electric motor.

3. The electric linear motion actuator according to claim 2, further comprising an abnormality detector which compares the rotation angle of the electric motor detected by the rotation angle detector and the one of the first rotation angle and the second rotation angle detected by the revolution sensor, and judges that an abnormality is occurring if a ratio between the rotation angle of the electric motor and the one of the first rotation angle and the second rotation angle exceeds a predetermined abnormality threshold value.

4. The electric linear motion actuator according to claim 2, wherein while the electric linear motion actuator is operating normally, a position of the outer ring member is controlled based on the one of the first rotation angle and the second rotation angle detected by the revolution sensor, and wherein if the revolution sensor becomes out of order, the position of the outer ring member is controlled based on the rotation angle of the electric motor detected by the rotation angle detector.

5. The electric linear motion actuator according to claim 3, further comprising an abnormality informing portion configured to inform outside about the abnormality, if any abnormality is detected by the abnormality detector.

6. The electric linear motion actuator according to claim 1, further comprising a reaction force receiving member supporting the carrier through a thrust bearing, wherein the revolution sensor comprises an annular target arranged coaxially with the carrier so as to rotate together with the carrier, and a target position detector fixed in position so as to be opposed to the annular target.

7. The electric linear motion actuator according to claim 6, wherein the target position detector is kept out of contact with the annular target, and wherein the target position detector comprises a light emitting portion which emits light toward the annular target, and a light receiving portion which receives light reflected by the target.

8. The electric linear motion actuator according to claim 6, wherein the annular target is magnetized such that first magnetic poles are arranged alternately with second magnetic poles opposite in polarity to the first magnetic poles in a circumferential direction, and wherein the target position detector is a magnetism detector kept out of contact with the annular target.

9. The electric linear motion actuator according to claim 2, wherein the rotation angle detector is a power supply unit which estimates the rotation angle of the electric motor based on a line voltage between lines through which electric power is supplied to the electric motor.

10. The electric linear motion actuator according to claim 3, wherein while the electric linear motion actuator is operating normally, a position of the outer ring member is controlled based on the one of the first rotation angle and the second rotation angle detected by the revolution sensor, and wherein if the revolution sensor becomes out of order, the position of the outer ring member is controlled based on the rotation angle of the electric motor detected by the rotation angle detector.

11. The electric linear motion actuator according to claim 2, further comprising a reaction force receiving member supporting the carrier through a thrust bearing, wherein the revolution sensor comprises an annular target arranged coaxially with the carrier so as to rotate together with the carrier, and a target position detector fixed in position so as to be opposed to the annular target.

12. The electric linear motion actuator according to claim 3, further comprising a reaction force receiving member supporting the carrier through a thrust bearing, wherein the revolution sensor comprises an annular target arranged coaxially with the carrier so as to rotate together with the carrier, and a target position detector fixed in position so as to be opposed to the annular target.

13. The electric linear motion actuator according to claim 4, further comprising a reaction force receiving member supporting the carrier through a thrust bearing, wherein the revolution sensor comprises an annular target arranged coaxially with the carrier so as to rotate together with the carrier, and a target position detector fixed in position so as to be opposed to the annular target.

14. The electric linear motion actuator according to claim 10, further comprising a reaction force receiving member supporting the carrier through a thrust bearing, wherein the revolution sensor comprises an annular target arranged coaxially with the carrier so as to rotate together with the carrier, and a target position detector fixed in position so as to be opposed to the annular target.

15. The electric linear motion actuator according to claim 3, wherein the rotation angle detector is a power supply unit which estimates the rotation angle of the electric motor based on a line voltage between lines through which electric power is supplied to the electric motor.

16. The electric linear motion actuator according to claim 4, wherein the rotation angle detector is a power supply unit which estimates the rotation angle of the electric motor based on a line voltage between lines through which electric power is supplied to the electric motor.

17. The electric linear motion actuator according to claim 10, wherein the rotation angle detector is a power supply unit which estimates the rotation angle of the electric motor based on a line voltage between lines through which electric power is supplied to the electric motor.

* * * * *